United States Patent Office 2,709,151
Patented May 24, 1955

2,709,151

PROCESS FOR THE RECOVERY OF GASOLINE FROM PETROLEUM OILS OR CRUDE RESIDUES BY DESTRUCTIVE HYDROGENATION WITH THE USE OF A CATALYST

Helmut Nonnenmacher, Mannheim, Willi Oettinger, Ludwigshafen (Rhine), and Ortwin Reitz, Heidelberg, Germany, assignors to Badische Anilin- & Soda-Fabrik Aktiengesellschaft, Ludwigshafen (Rhine), Germany No Drawing. Application May 8, 1951, Serial No. 225,258

Claims priority, application Germany December 1, 1950

15 Claims. (Cl. 196—53)

In the recovery of gasoline from petroleum oils or crude residues, in particular those poor in asphalt and rich in hydrogen by the catalytic destructive hydrogenation method it has been the common practice to first process the feed stock in the so-called sump phase desirably while adding finely divided catalysts, the liquid phase product then being distilled and the heavy oil components recycled to the liquid phase until the high boiling oils have been largely converted into middle oils. For removing such substances as would have an injurious effect upon the catalyst of the following hydrogenation stage, the middle oil derived from the distilled low boiling products is presaturated and then subjected to destructive hydrogenation in the gas phase, thus being converted into gasoline. It was hitherto thought indispensable in the art to operate in at least two stages for the reason that the catalysts conventionally used in the second, gasoline-producing stage are so highly sensitive to carbon deposits that they would soon lose their catalytic activity in direct contact with crude oils.

We have now found, that petroleum oils or crude residues poor in asphalt and rich in hydrogen i. e. raw materials giving a non-distillable residue by vacuum distillation, may be substantially converted into gasoline by a one-stage destructive hydrogenation process with the catalysts staying active for a long time, by passing the raw materials, at temperatures of between 400 and 550° C. and at pressures of more than 200 atmospheres, over fixed-bed catalysts consisting of natural or synthetic silicates, silica gel or alumina to which small quantities of a molybdenum or tungsten compound and conveniently still smaller quantities of a chromium, nickel, cobalt or iron compound are added, at such a rate of flow that the reaction product formed in a once-through operation together with less than 6% by weight of gas (methane, ethane), for instance about 2 to 4% (referring to the initial material used) contains at least 35% or more, for instance 40% or more of gasoline, but that no more than a maximum of about 65% of gasoline is formed, the components having a higher boiling point than gasoline being recycled. In this way, more than 80% by weight of gasoline, for instance 85% and more, or more than 90% of gasoline and motor gas are produced. In a preferred embodiment of this invention the throughput is from 0.2 to 1.5 kilograms per litre of catalyst per hour, for instance 0.8 to 1.0. Hydrogen or hydrogen containing gas is used to the extent of 1 to 4, more particularly of 1.5 to 3.5 m.³ per each kilogram of raw material. Examples of raw materials contemplated for use in the process of the present invention are crude oils from the Near East or German Crude oils. They should be rich in hydrogen and should contain no less than 12% hydrogen and no more than about 2% asphalt (determined by the Holde method). Oils containing asphalt but being poor in hydrogen may also be used as raw materials provided they are subjected, prior to processing, to a presaturation in order to increase their hydrogen content and at the same time cut down their asphalt content.

The catalysts used are natural silicates, such as fuller's earth, or synthetic silicates, conveniently those precipitated from a solution of potassium silicate having a pH-value of between 1 and 6.5, in particular zinc-magnesium and/or aluminum silicates, synthetic or natural aluminas, in particular an alumina obtained by precipitating and peptization. These aluminas may have 1 to 50%, in particular 3 to 20%, of active silicic acid or silicates added to them.

Active aluminas are made, for example, by starting from aqueous solutions of aluminum salts and precipitating the latter with ammonia. The precipitation is advantageously done in a stirring or shaking vessel.

When an alkali aluminate solution is used, the hydroxide is precipitated most conveniently by adding acid until a pH-value of less than 7 is set up. The hydroxide separated is practically freed from alkali by washing. The precipitate so obtained, desirably after being predried, is peptized with acid to form a paste or sludge, shaped, dried and activated by cautious heating up to 450° to 500° C. For peptization and the precipitation of the aluminate solution nitric acid is used to special advantage. According to a modified technique in the making of alumina, the aluminum salt solution and the precipitate may be poured without preheating into an adequately heated vessel or liquor. In this case, maintaining temperatures upwards of 80° C., for instance 85° to 100° C. and a pH-value of about 7 to 10 is essential. Temperatures above the boiling point of the reaction mixture under atmospheric pressure may also be applied when operating in a closed vessel, for instance under pressures of 5 atmospheres and above.

These carrier substances are provided with aqueous solutions of molybdenum and/or tungsten compounds, for instance ammonium molybdate and simultaneously or subsequently impregnated with solutions of chromium, nickel, cobalt or iron salts. Before being provided with the metal compounds aforesaid, the carrier substances may be given a pre-treatment with mineral acids, such as hydrochloric acid or hydrofluoric acid. The acid treatment may also follow the application of the metal compounds. In the usual case, from 0.5 to 20% and more of molybdenum and/or tungsten compound, referring to the catalyst mass, and from 5 to 50 of the chromium, nickel, cobalt or iron compounds, referring to the molybdenum or tungsten compound applied, are used. When relatively low pressures are used, say 200 to 400 atmospheres, the carriers used are silicates prepared by special methods or highly active aluminas, such as are obtained, for instance, by precipitation above 80° C. at a pH-value of 7 to 10, or by peptization, advantageously mixed with active silicic acid or silicates or, in certain cases, also fuller's earths pre-treated with hydro-fluoric acid. When pressures above about 350 to 450 atmospheres are used natural silicates also, as fuller's earths which may have been pre-treated with mineral acids, in particular hydro-fluoric acid, or active aluminas produced in standard fashion, or activated bauxite may be used.

In the practice of the instant process, the temperature of between 400 and 550° C., the pressure of between 200 and about 800 atmospheres, the throughput within the given limits, and the amount of the metal compounds on the carrier are so correlated for the particular oil to be processed that the reaction product obtained in a once-through operation contains at least 35% of gasoline and that no more than 65% of gasoline are formed from the raw material. It is advantageous in the practice of our process that the optimum amount of catalytically active metal compound should be chosen for the carrier. The lower the pressure, the greater must be the amount of the metal compound incorporated in the carrier, whereas smaller amounts are needed at higher pressures. Thus, for example, in processing oils having a hydrogen content of from 12 to 13% and an asphalt content (after Holde) inferior to 1%, at a pressure of 200 to 350 atmospheres, a carrier consisting of active alumina and active silicic acid and having incorporated with it from 10 to 25%, more particularly from 12 to 20%, molybdenum or tungsten compound is used, whereas with pressures of the order of 350 to 800 atmospheres fuller's earth may be used as a carrier, preferably after being pre-treated with hydro-fluoric acid, and this be incorporated with from 0.5 to 15%, more particularly from 3 to 7%, of molybdenum or tungsten compound. In both cases, higher percentages of metal compound would result in poorer yields. Adding chromium, nickel, cobalt or iron compounds is to be recommended especially at pressures below 450 atmospheres or better below 350 atmospheres.

The fractions having a higher boiling point than gasoline are recycled so that the raw material is almost completely converted into gasoline or gasoline and motor gas.

If some diesel fuel is wanted in addition to gasoline, middle oil may be withdrawn continuously from the reaction product in about the same amount as was contained in the raw material at the start but about 10% by weight more at the highest, referring to the total percentage of middle oil in the final product. A maximum of about 10%, referring to the middle oil formed, may be withdrawn also when no middle oil is contained in the raw material. In this case, the operating conditions should also be so selected that more than 80%, in particular more than 85%, of the components having a higher boiling point than gasoline, are converted into gasoline or more than 90% are converted into gasoline and motor gas. By the withdrawal of middle oil the percentage of liquid products in the reaction chamber is increased, so that the upper limit mentioned of about 10% should not be exceeded.

In the practice of our process a mixed phase of liquid and gaseous substances is set up in the reaction chamber, the working conditions being preferably so selected within the given limits that no more than 35%, more preferably no more than 20% of the raw material are present in the reaction chamber in the liquid phase. In order that this condition be ensured, i. e., that the liquid portion be small in the reaction chamber, such oils should preferably be added as are completely evaporated under the prevailing conditions, for instance middle oil.

The surprising fact about this process which could by no means be anticipated is that the catalysts stay active for a long time though the raw materials contain high molecular compounds leading to coke-like residues on distillation.

The high-grade conversion of the oils contemplated for use in the present process into gasoline and the long life of the catalysts can only be obtained if about 65%, at most, of gasoline are produced in a once-through operation and at least 35%, preferably more, of gasoline are contained in the final product. If too small an amount of gasoline be formed, the catalyst drops off in activity. If more than 65% of gasoline is produced the output drops off with the consequent risk of coke deposits on the catalysts.

Also in the prior art technique of processing these oils in two stages—with the heavy oil being converted into middle oil in a cyclic fashion in the first stage and the middle oil being converted into gasoline in the second stage—the life of the catalysts in the first stage is shorter than in the process according to our invention.

Lest the efficiency of the catalyst be injuriously affected by deposits of inorganic constituents (ash) of the raw materials in long-service operation, substances having lump, granular or pilled form, especially Raschig rings, may for de-ashing purposes be arranged before these and kept at a temperature which comes near or equals the reaction temperature. These substances are preferably selected from among inert materials, such as alumina, Rachig rings of alumina or metal, for instance aluminum.

The following example serves to illustrate more fully the nature of this invention and how the same is to be performed in practice, it being understood, however, that the invention is not restricted to the embodiment given in this example.

*Example*

An oil of Near Eastern origin having a specific gravity of 0.838 and containing about 20% of gasoline, 36% of middle oil and 44% of residues is stripped of the gasoline and then passed over a pilled catalyst at a rate of 1 kilogram per litre of catalyst space an hour at a pressure of 500 atmospheres and a temperature of 460° C. concurrently with 3 m.$^3$ of hydrogen per kilogram of oil an hour. The catalyst consists of a commercial fuller's earth and was treated with 10% hydro-fluoric acid for about half an hour at room temperature while stirring, then dried and pilled. Prior to use the fuller's earth was soaked with an ammonium molybdate solution in such a way that the ready-for-use catalyst contains 5% of molybdenum oxide, and then heated to 400° to 450° C. In a once-through operation a liquid product is obtained which consists of 40% of gasoline and 60% of components having a higher boiling point than gasoline, the latter being recycled into the reaction vessel. When processed in this maner the oil yields 89% by weight of gasoline and 9% by weight of motor gas making a total of 98 parts by weight of motor fuel to 100 parts by weight of crude oil started from. The catalysts used in this process stay active for some six months, but their life may be 12 months and more if the crude oil be de-ashed by arranging a furnace charged with Raschig rings of alumina or with an equal type catalyst in front of one or a plurality of catalyst-filled furnaces.

What we claim is:

1. A process of producing gasoline directly from a crude oil which comprises concurrently passing hydrogen and a crude oil substantially free from gasoline and which contains not more than 2% asphalts and at least 12% hydrogen at a temperature of between 400° C. and 550° C. and under a pressure of between 200 and 800 atmospheres over a de-ashing substance and then at the said conditions of temperature and pressure over a fixed bed of catalyst at an oil rate of 0.2 to 1.5 kilograms per liter of catalyst per hour, the carrier of said catalyst being made up of at least one substance from the group consisting of silicates, silica gel and alumina and being provided with a minor proportion of a compound of a metal of the group consisting of molybdenum and tungsten; and maintaining reaction conditions such that no more than 35% of the hydrocarbon content of the reaction zone is in the liquid phase and such that the reaction product formed in a once-through operation contains less than 6% by weight of gas and at least 40% but not more than 65% by weight of gasoline.

2. A process of producing gasoline directly from a crude oil which comprises concurrently passing hydrogen and a crude oil substantially free from gasoline and which contains not more than 2% asphalts and at least 12% hydrogen at a temperature of between 400° C. and 550° C. and under a pressure of between 200 and 800 atmospheres over a de-ashing substance and then at the said conditions of temperature and pressure over a fixed bed of catalyst at an oil rate of 0.2 to 1.5 kilograms per liter of catalyst per hour, the carrier of said catalyst being made up of at least one substance from the group consisting of silicates, silica gel and alumina and being provided with a minor proportion of a compound of a metal of the group consisting of molybdenum and tungsten; maintaining reaction conditions such that no more than 35% of the hydrocarbon content of the reaction zone is in the liquid phase and such that the reaction product formed in a once-through operation contains less than 6% by weight of gas and at least 40% but not more than 65% by weight of gasoline; and recycling product fractions having a higher boiling point than gasoline.

3. A process of producing gasoline directly from a crude oil which comprises concurrently passing hydrogen and a crude oil substantially free from gasoline and which contains not more than 2% asphalts and at least 12% hydrogen at a temperature of between 400° C. and 550° C. and under a pressure of between 200 and 800 atmospheres over a de-ashing substance and then at the said conditions of temperature and pressure over a fixed bed of catalyst at an oil rate of 0.2 to 1.5 kilograms per liter of catalyst per hour, the carrier of said catalyst being made up of at least one substance from the group consisting of silicates, silica gel and alumina and being provided with a minor proportion of a compound of a metal of the group consisting of molybdenum and tungsten; maintaining reaction conditions such that no more than 35% of the hydrocarbon content of the reaction zone is in the liquid phase and such that the reaction product formed in a once-through operation contains less than 6% by weight of gas and at least 40% but not more than 65% by weight of gasoline; withdrawing the gasoline and an amount of middle oil from the reaction product, said amount being not greater than the amount contained in the crude oil plus about 10% of the middle oil formed; and recycling the remainder of the product having a higher boiling point than gasoline.

4. The process defined in claim 1 wherein the de-ashing substance is alumina.

5. The process defined in claim 3 wherein the de-ashing substance is alumina.

6. The process defined in claim 1 wherein the catalyst carrier is provided with from 10 to 25% by weight of the catalyst of a compound of a metal of the group consisting of molybdenum and tungsten when a pressure of between 200 and 350 atmospheres is used, and with from 0.5 to 15% of said compound when a pressure of between 350 and 800 atmospheres is used.

7. The process defined in claim 3 wherein the catalyst carrier is provided with from 10 to 25% by weight of the catalyst of a compound of a metal of the group consisting of molybdenum and tungsten when a pressure of between 200 and 350 atmospheres is used, and with from 0.5 to 15% of said compound when a pressure of between 350 and 800 atmospheres is used.

8. The process defined in claim 1 wherein hydrogen is used at a rate of about 1 to 4 cubic metres per kilogram of crude oil.

9. The process defined in claim 3 wherein hydrogen is used at a rate of about 1 to 4 cubic metres per kilogram of crude oil.

10. The process defined in claim 1 wherein oil which is completely vaporized under the reaction conditions is additionally provided in the reaction zone to maintain the said proportion of liquid phase.

11. The process defined in claim 3 wherein oil which is completely vaporized under the reaction conditions is additionally provided in the reaction zone to maintain the said proportion of liquid phase.

12. The process defined in claim 2 wherein all of the product fractions having a higher boiling point than gasoline are recycled.

13. The process defined in claim 3 wherein the crude oil is substantially free from middle oil.

14. The process defined in claim 3 wherein the crude oil is substantially free from middle oil, about 10% of the middle oil formed is withdrawn from the reaction product, and more than 80% of the remainder of the product having a higher boiling point than gasoline is converted into gasoline.

15. A process of producing gasoline directly from a crude oil which comprises concurrently passing hydrogen and a crude oil substantially free from gasoline and which contains not more than 2% asphalts and at least 12% hydrogen at a temperature of between 400° C. and 550° C. and under a pressure of between about 350 and 800 atmospheres over a de-ashing substance and then at the said conditions of temperature and pressure over a fixed bed of catalyst at a hydrogen rate of about 1.5 to 3.5 cubic metres per kilogram of oil and at an oil rate of about 0.8 to 1 kilogram per liter of catalyst per hour, said catalyst consisting essentially of hydrofluoric acid-treated fuller's earth containing about 3 to 7% by weight of the catalyst of molybdenum oxide; maintaining reaction conditions such that no more than 35% of the hydrocarbon content of the reaction zone is in the liquid phase and such that the reaction product formed in a once-through operation contains less than 6% by weight of gas and at least 40% but not more than 65% by weight of gasoline; and recycling all of the product fractions having a higher boiling point than gasoline.

References Cited in the file of this patent

UNITED STATES PATENTS

| | | |
|---|---|---|
| 2,278,407 | Anthes et al. | Apr. 7, 1942 |
| 2,325,072 | Pier et al. | July 27, 1943 |
| 2,428,692 | Voorhies | Oct. 7, 1947 |
| 2,541,229 | Fleming | Feb. 13, 1951 |

OTHER REFERENCES

"Fuel Oil Manual," Schmidt Industrial Press, New York (1951), pages 37 and 53 to 56.